Aug. 12, 1924.  
W. A. LAYCOCK ET AL  
CIRCUIT MAKER AND BREAKER  
Filed March 1, 1923  
1,505,041  
2 Sheets-Sheet 1

Inventor  
WILBUR A. LAYCOCK,  
JOHN C. FARRAR,  
HARRY H. WOLBERT.  
By Watson E. Coleman  
Attorney

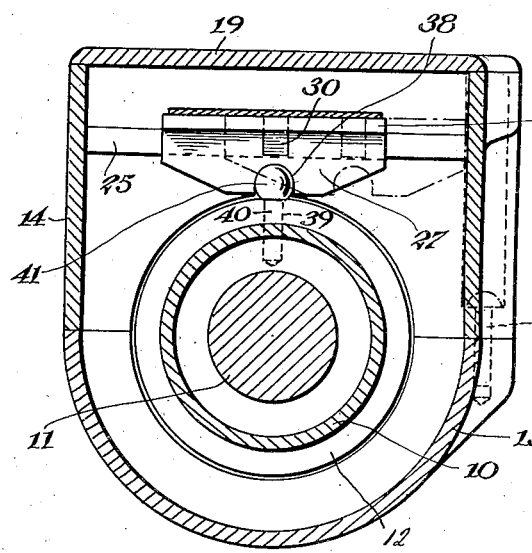
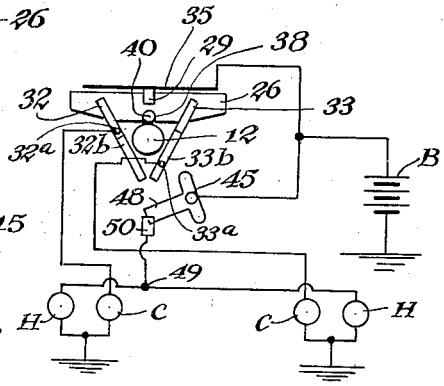
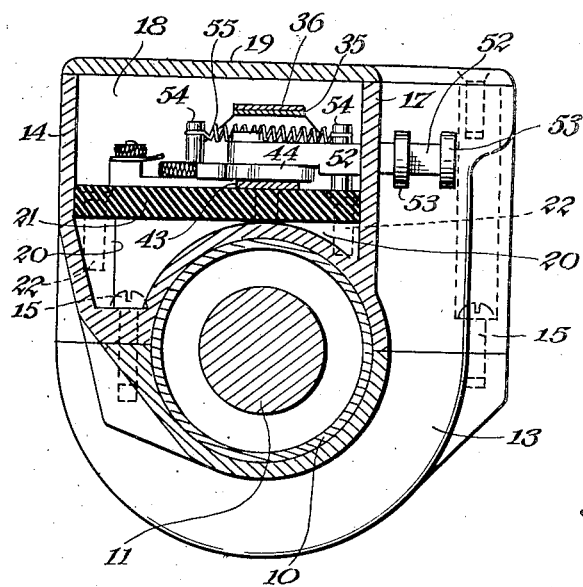
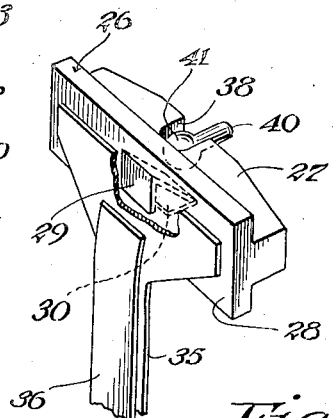

Patented Aug. 12, 1924.

1,505,041

UNITED STATES PATENT OFFICE.

WILBUR A. LAYCOCK, JOHN C. FARRAR, AND HARRY H. WOLBERT, OF DELTA, COLORADO, ASSIGNORS TO MOTOR CURVE LIGHT COMPANY, OF DELTA, COLORADO, A CORPORATION OF COLORADO.

CIRCUIT MAKER AND BREAKER.

Application filed March 1, 1923. Serial No. 622,117.

*To all whom it may concern:*

Be it known that we, WILBUR A. LAYCOCK, JOHN C. FARRAR, and HARRY H. WOLBERT, citizens of the United States, residing at Delta, in the county of Delta and State of Colorado, have invented certain new and useful Improvements in Circuit Makers and Breakers, of which the following is a specification, reference being had to the accompanying drawings.

This invention relates to circuit makers and breakers and more particularly to a device of this character embodying an automatic switch and a manually operated switch, the principal purpose of the invention being to provide a compact structure combining switches of this character so that the same may be rendered adaptable for use in conjunction with light control systems for motor vehicles.

A further object of the invention is to provide an improved switch of the character set forth in our co-pending application, Serial No. 611,056, filed January 6, 1923, for circuit makers and breakers.

A still further object of the invention is to provide a combined device of this character in which connections may be easily made and in which the number of necessary parts is reduced to a minimum.

A still further object of the invention is to provide a device of this character of a construction suitable for mounting upon the steering post of an automobile in such manner that the automatic switch may be operated from a moving part of the steering mechanism and a manual switch may be so disposed as to be readily controlled by the operator of the vehicle.

A still further object of the invention is to provide a device of this character particularly adapted for use in conjunction with a vehicle employing a lighting system such as set forth in our co-pending application, Serial No. 611,055, filed January 6, 1923, for road illumination control for vehicles.

In the last named application we have described a control system for controlling the headlights of an automobile and for controlling a pair of curve illuminating lights, or lights which direct rays to the side of the road upon which a vehicle is traveling upon a turning movement of the vehicle toward such side of the road. As set forth in this application, the control means is necessarily partially manual and partially automatic. The present invention resides in an improved structure combining these features.

These and other objects we attain by the construction and arrangement shown in the accompanying drawings, wherein for the purpose of illustration is shown a preferred embodiment of our invention and wherein like reference characters designate like parts throughout.

In the drawings:—

Figure 3 is a transverse sectional view taken substantially upon line 3—3 of Figure 1;

Figure 4 is a view similar to Figure 3 taken in section below the line 3—3 of Figure 1;

Figure 5 is a diagrammatic plan view illustrating the circuits and connections with the various parts of the present switch when the latter is employed for the control of the headlights and curve illuminating lights of a motor vehicle; and Figure 6 is a fragmentary perspective view of the slidable switch element and adjacent parts.

Figure 1:
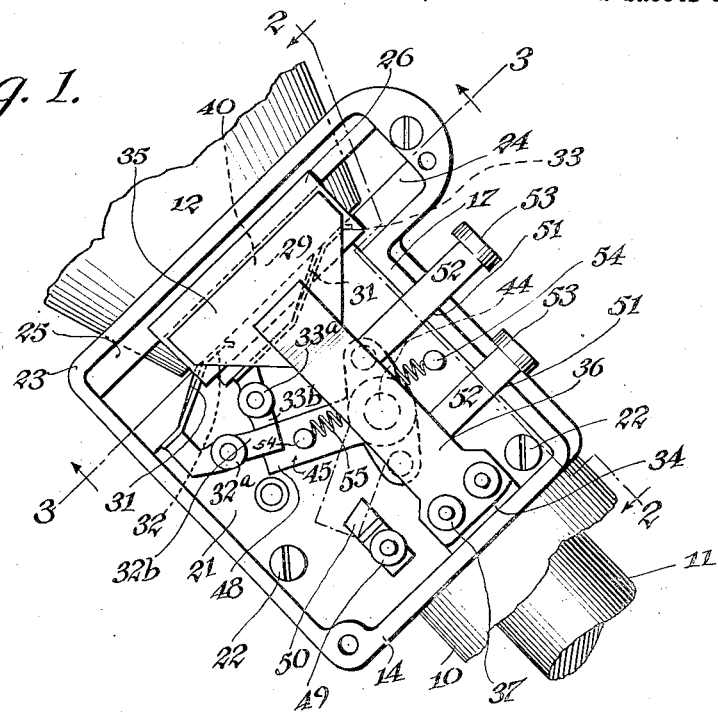
Figure 1 is a fragmentary side elevational view showing the steering post, the mast and the hub of a steering wheel of a vehicle with a switch applied thereto constructed in accordance with the present invention and with the cover plate of the switch removed.

Referring now more particularly to the drawings, the numeral 10 designates a mast of a steering gear, 11 a steering shaft and 12 a hub of a steering wheel, by means of which the steering shaft 11 is rotated to control the direction of the vehicle wheels. The numerals 13 and 14 designate clamping sections secured together as at 15 about the mast 10 and having clamping engagement therewith, these sections being formed at their ends to provide about the hub 12, at the lower end thereof, a channel 16. Extending outwardly from the section 14 are walls 17 forming upon the outer surface thereof a compartment 18, the outer end of which is closed by a removable cover plate 19.

The walls 17 have formed thereon lugs 20 forming a seat for a plate 21 of insulating material which is held in position upon the lugs by securing elements 22 extending through the plate 21 and engaged in the lugs 20. This plate has formed upon that end thereof next adjacent the wall 23 of the section 14 which forms the end wall of the channel 16 a flange 24. The wall 23 has formed upon its inner face an outstanding rib 25, the outer face of which, or that face next adjacent the cover plate 19, is complanar with the corresponding face of the flange 24 of the plate 21.

The numeral 26 designates an automatic switch element substantially T-shaped in cross section, those portions thereof forming the head of the T resting upon the outer surface of the rib 25 and flange 24, the stem portion 27 thereof being slidable between adjacent faces of the rib and flange. The outer face of the head 28 is provided with a contact 29 electrically connected with a second contact 30 disposed at that side of the stem 27 next adjacent the flange 24. The flange 24 is provided at spaced points with slots 31 through which extend the ends of resilient contacts 32 and 33, the opposite ends of which are connected with binding posts 32$^a$ and 33$^a$ respectively.

Figure 2:
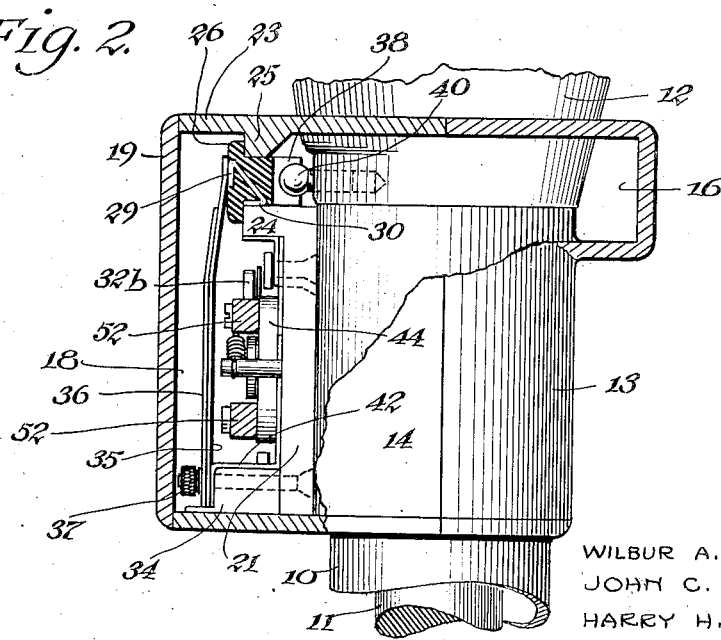
Figure 2 is a view partly in side elevation and partly in section on line 2—2 of Figure 1.

At the opposite end of the plate 21 from the flange 24 an insulatory support 34 is provided, to the outer end of which is secured a resilient contact member 35, and a spring 36 bearing against the contact member and forcing the extremity of the same into engagement with the outer surface of the head 28, these elements being mounted upon the support 34 by means of a binding post 37. The inner face of the stem portion 27 of the automatic switch element has formed therein a notch 38 and the hub 12 of the steering wheel has formed therein a socket 39 in which is mounted a stem 40 having a spherical head 41 engaging in the notch 38. By inspecting Figures 2 and 3 it will be seen that upon rotation of the steering wheel the head and notch engagement will cause longitudinal shifting of the automatic switch element 26 upon its trackway, the direction of movement being dependent upon the direction of rotation of the steering wheel. It will likewise be seen that the movement of the automatic switch element, under influence of a steering wheel, is only through a predetermined distance, the head 41 leaving the notch 38 when this distance has been traveled, so that there is no interference with the operation of the steering wheel by the switch element. The switch element will be retained in the position at which the head leaves it by the resilient engagement of the contact 35 therewith in the event that jar is applied to the vehicle, that would otherwise cause slight shifting thereof. It is pointed out that this resilient contact will permit the switch element to give or yield outwardly and the head 41 to pass the same until it again aligns with the notch 38, at which time the switch element will assume its normal position. It will be noted that upon movement of the switch element 26 upon its trackway a predetermined distance in either direction the contact 30 is engaged with one of the contacts 32 or 33 with the result that a circuit is completed from the binding post 37 through contact arm 35, contacts 29 and 30, contact 32 or 33 to binding post 32$^a$ or 33$^a$.

Mounted upon the binding post 37 beneath the contact 35 is a connector strip 42 which fits against the support 34 and has an end portion 43 lying flatly upon the plate 21. This end portion has extended therethrough and electrically connected therewith a pivot member 44 upon which is mounted a switch blade 45 substantially T-shaped in plan, the stem of the T forming the blade and the head of the T being engaged with the pivot.

The binding posts 32$^a$ and 33$^a$ are provided with contacts 32$^b$ and 33$^b$ adapted for coaction with the blade 48 and for simultaneous engagement thereby, these contacts having their end portions in proximity. Upon the plate 21 in spaced relation to the binding posts 32$^a$ and 33$^a$ is a binding post 49 having a contact 50 for coaction with the blade. One wall 17 of the section 14 has formed therein apertures 51 through which are directed stems 52 of operating buttons 53, the ends of the stems being pivotally engaged with opposite extremities of the head of the switch member 45, the stem of which forms the blade proper indicated at 48. By engaging the buttons the blade 48 may be alternated between the contact 50 and the contacts 32$^b$ and 33$^b$. Mounted upon the plate 21 at that side thereof remote from the blade 48 with regard to the pivot element 44 thereof and upon the blade 48 are pins 54 engaged by opposite ends of a tension spring 55, the pins 54 being so arranged that they are aligned with the pivot element 44 when the blade 48 is at a point intermediate the contacts 50, 32$^b$ and 33$^b$ and engaged with none thereof. This spring operates after the usual manner of springs of snap switches completing the swinging of the switch blade after the blade has been manually moved a predetermined distance and providing a rapid engagement of the blade with its contacts.

In Figure 5 is shown a wiring diagram including a switch of this character. In this diagram it will be noted that the switch blade member 45 and accordingly the blade proper 48 thereof is electrically connected with one terminal of the battery, the opposite terminal of which is grounded. With the first terminal of the battery the contact element 35 is likewise electrically connected. It will be seen that these connections may be accomplished by simply engaging a lead connected with the desired terminal of the battery with the binding post 37. The curve illuminating lights designated at C are each connected with one of the binding posts 32ª or 33ª and the binding post 49 is connected with each of the headlight elements H. It will be seen that upon engagement of the blade 48 with the contact 50 the bright headlights will be illuminated and that during this period upon rotation of the steering wheel to a predetermined distance in either direction, one of the curve lights C will be illuminated. If, however, the switch blade 48 is engaged with the contacts 32ᵇ, 33ᵇ the headlights will be extinguished and the curve lights simultaneously illuminated to permit their use as dimmers.

From the foregoing it is believed to be obvious that a switch constructed in accordance with our invention may be readily applied to a vehicle and so constructed that the parts thereof are readily accessible for replacement or repair and furthermore so constructed that a maximum control of the head and curve lights is permitted. It will furthermore be obvious that the construction of the switch as hereinbefore set forth is capable of some change and modification without materially departing from the spirit of our invention and we accordingly do not limit ourselves to such specific structure except as hereinafter claimed.

It will be seen that when the steering wheel is operated to guide the vehicle around a curve, the curve illuminating lights will be automatically illuminated for lighting the curved pathway of the vehicle at which time the curve illuminating lights are operated singly. It will also be seen that when the headlights are manually extinguished and the curve illuminating lights are lighted simultaneously, they are used in lieu of the usual dimmers, the road being lighted on both sides so that it is perfectly safe to proceed at normal speed and at the same time no glare is presented to the eyes of the oncoming driver so that he is able to see his pathway.

What we claim is:—

1. In an electric switch of the class described, a casing constructed for attachment to the steering post mast of a motor vehicle and having a chamber, a plate of insulating material fixed within the chamber and having a lateral outwardly projecting flange upon its upper end, a rib projecting inwardly from the top wall of the casing parallel with and spaced above said flange to provide a guideway between the rib and the flange, a movable switch element mounted for rectilinear reciprocating movement in said guideway, circuit controlling means associated with said movable switch element, and means to operatively connect said movable switch element to the steering post, said movable switch element having a head engaging the outer faces of the rib and the flange, and said circuit controlling means including a resilient yieldable contact member having one end fixed in the casing and having its other end bearing upon the head of the movable switch element to retain the latter in its guideway.

2. In an electric switch of the class described, a casing constructed for attachment to the steering post mast of a motor vehicle and having a chamber, a plate of insulating material fixed within the chamber and having a lateral outwardly projecting flange upon its upper end, a rib projecting inwardly from the top wall of the casing parallel with and spaced above said flange to provide a guideway between the rib and the flange, a movable switch element mounted for rectilinear reciprocating movement in said guideway, circuit controlling means associated with said movable switch element, and means to operatively connect said movable switch element to the steering post, said movable switch element having a head engaging the outer faces of the rib and the flange, and said circuit controlling means including a resilient yieldable contact member having one end fixed in the casing and having its other end bearing upon the head of the movable switch element to retain the latter in its guideway, the operative connection between the movable switch element and the steering post including a pin in fixed relation to the steering post, and the inner side of the movable switch element being formed with a notch into which said pin projects.

3. In an electric switch of the class described, a casing constructed for attachment to the steering post mast of a motor vehicle and having a chamber, a plate of insulating material fixed within the chamber and having a lateral outwardly projecting flange upon its upper end, a rib projecting inwardly from the top wall of the casing parallel with and spaced above said flange to provide a guideway between the rib and the flange, a movable switch element mounted for rectilinear reciprocating movement in said guideway, circuit controlling means associated with said movable switch element, and means to operatively connect said movable switch element to the steering post, a pair of contacts mounted on the insulating plate and having portions exposed at spaced points at the upper side of the flange, and a second manually operable movable switch element for simultaneously connecting said pair of contacts.

4. In an electric switch of the class described, a casing constructed for attachment to the steering post mast of a motor vehicle and having a chamber, a plate of insulating material fixed within the chamber and having a lateral outwardly projecting flange upon its upper end, a rib projecting inwardly from the top wall of the casing parallel with and spaced above said flange to provide a guideway between the rib and the flange, a movable switch element mounted for rectilinear reciprocating movement in said guideway, circuit controlling means associated with said movable switch element, and means to operatively connect said movable switch element to the steering post, a pair of contacts mounted on the insulating plate and having portions exposed at spaced points at the upper side of the flange, and a second manually operable movable switch element for simultaneously connecting said pair of contacts, a contact carried by the first named movable switch element and alternately engageable with said pair of contacts, another contact connected to the last named contact and exposed at the outer side of the first named movable switch element, and means electrically connecting the last named movable switch element and the last named contact in all positions of said first named movable switch element.

5. In an electric switch of the class described, a casing constructed for attachment to the steering post mast of a motor vehicle and having a chamber, a plate of insulating material fixed within the chamber and having a lateral outwardly projecting flange upon its upper end, a rib projecting inwardly from the top wall of the casing parallel with and spaced above said flange to provide a guideway between the rib and the flange, a movable switch element mounted for rectilinear reciprocating movement in said guideway, circuit controlling means associated with said movable switch element, and means to operatively connect said movable switch element to the steering post, a pair of contacts mounted on the insulating plate and having portions exposed at spaced points at the upper side of the flange, and a second manually operable movable switch element for simultaneously connecting said pair of contacts, a contact carried by the first named movable switch element and alternately engageable with said pair of contacts, another contact connected to the last named contact and exposed at the outer side of the first named movable switch element, and means for placing the last named contact in constant connection with said last named movable switch element in all positions of said first named movable switch element, said last named means including a resilient T-shaped strip having the end of its stem fixed in the casing and having the head thereof yieldingly engaging the outer face of the first named movable switch element.

6. In an electric switch of the class described, a casing constructed for attachment to the steering post mast of a motor vehicle and having a chamber, a plate of insulating material fixed within the chamber and having a lateral outwardly projecting flange upon its upper end, a rib projecting inwardy from the top wall of the casing parallel with and spaced above said flange to provide a guideway between the rib and the flange, a movable switch element mounted for rectilinear reciprocating movement in said guideway, circuit controlling means associated with said movable switch element, and means to operatively connect said movable switch element to the steering post, a pair of contacts mounted on the insulating plate and having portions exposed at spaced points at the upper side of the flange, and a second manually operable movable switch element for simultaneously connecting said pair of contacts, a contact carried by the first named movable switch element and alternately engageable with said pair of contacts, another contact connected to the last named contact and exposed at the outer side of the first named movable switch element, means for placing the last named contact in constant connection with the last named switch element in all positions of said first named movable switch element, said last named means including a resilient T-shaped strip having the end of its stem fixed in the casing and having the head thereof yieldingly engaging the outer face of the first named movable switch element, and a still further contact fixed in the casing adapted for connection in an electric circuit and engageable by the second named movable switch element when the latter is disengaged from said pair of contacts.

In testimony whereof we hereunto affix our signatures.

WILBUR A. LAYCOCK.
JOHN C. FARRAR.
HARRY H. WOLBERT.